Aug. 25, 1936. J. F. WHISENAND 2,052,064
WHEEL MOUNT
Filed Sept. 5, 1934  2 Sheets-Sheet 2
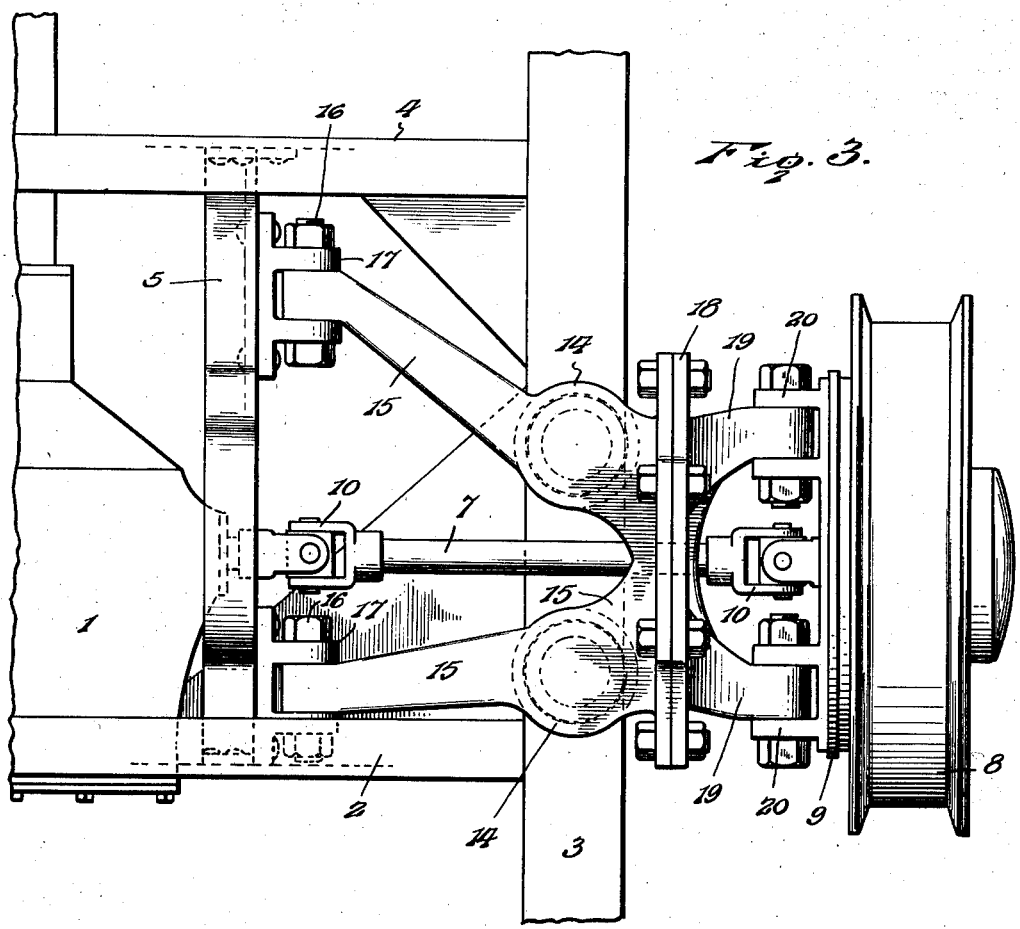
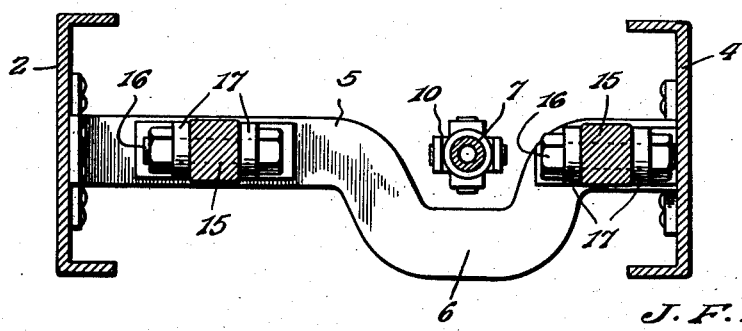
Inventor
J. F. Whisenand.
By Lacey & Lacey,
Attorneys Patented Aug. 25, 1936

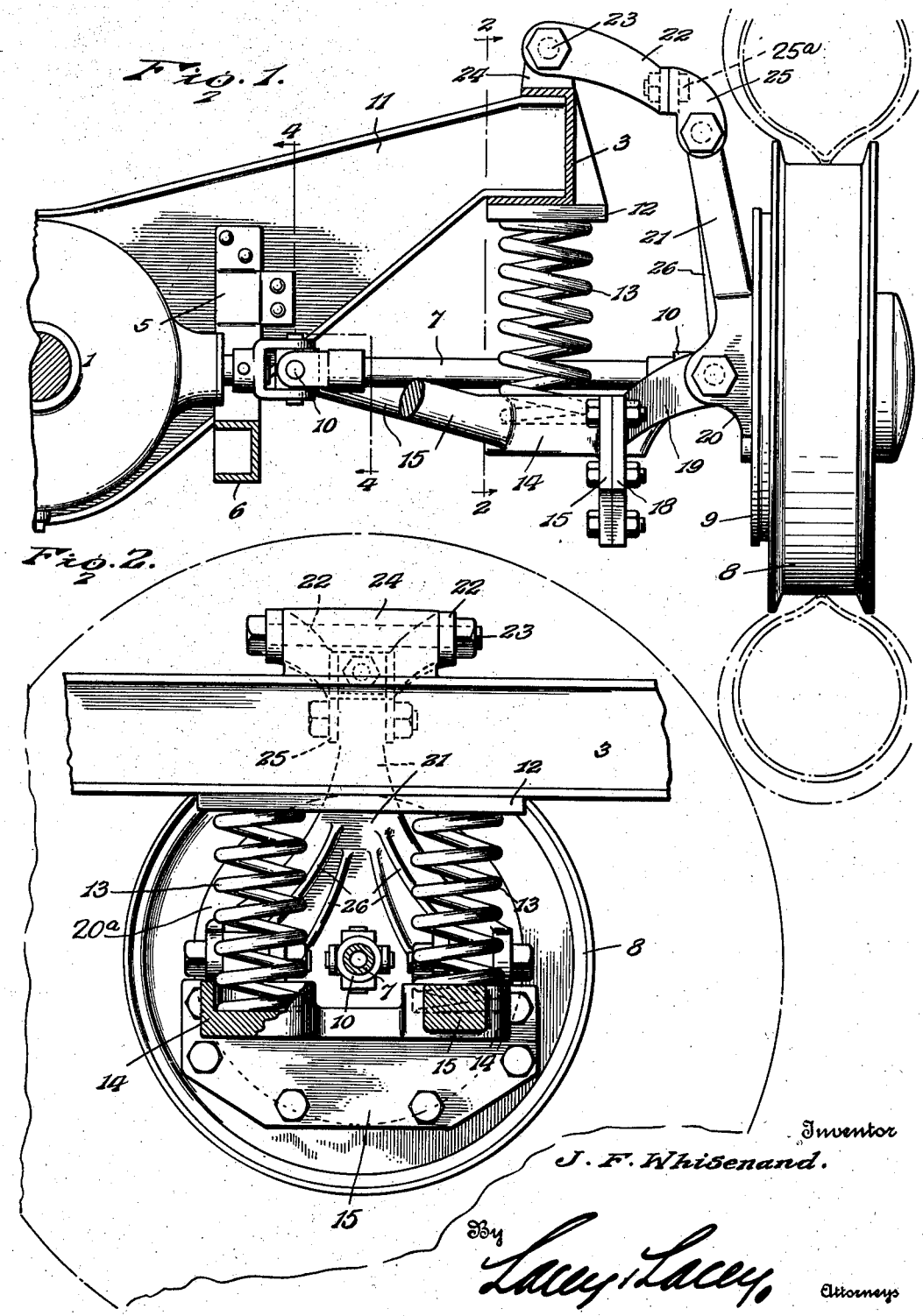

2,052,064

UNITED STATES PATENT OFFICE 2,052,064

WHEEL MOUNT

James F. Whisenand, Hastings, Nebr.

Application September 5, 1934, Serial No. 742,827

1 Claim. (Cl. 267—20)

This invention relates to wheel mounts for motor vehicles and has for its object the provision of simple and compact means whereby the wheel will be firm in use but may readily ride over inequalities in a road bed without imparting excessive motion to the body of the vehicle. The invention is illustrated in the accompanying drawings and consists in certain novel features which will be hereinafter first fully described and then more particularly defined in the appended claim.

In the drawings:

Figure 1 is a front elevation, with parts broken away and in section, of so much of a wheel support as will give an understanding of my invention.

Figure 2 is a transverse section on the line 2—2 of Figure 1.

Figure 3 is a bottom plan view of the parts shown in Figure 1.

Figure 4 is a transverse section on the line 4—4 of Figure 1.

In the drawings, the reference numeral 1 indicates a portion of the differential housing which is of the usual construction and is supported by the chassis or framework of the vehicle. In the present instance, an additional cross beam 2 is provided at the rear of the differential and is secured to the rear end of the same, as clearly shown in Figure 3, the ends of this beam being secured to the sills 3 in any approved manner. In advance of the cross beam 2 and parallel therewith is a second cross beam 4 which is secured to the sills of the chassis and furnishes an additional support for the housing of the propeller shaft. A longitudinal beam 5 is disposed at the side of the differential housing and extends parallel with the sills 3 and the propeller shaft, as clearly shown in Figure 3, the said longitudinal beam having a dipped portion 6 which will extend under the shaft 7 which connects the differential gear with the axle of the wheel, the wheel being indicated at 8 and being connected with the brake drum 9 in the well-known manner. The shaft 7 is connected at its ends by gimbal joints 10 with the axle of the wheel and with the drive shaft of the differential, this construction and arrangement permitting the wheel to ride over bumps in the road without binding of any of the parts.

An arm 11 is formed on or secured rigidly to the differential housing and extends upwardly and laterally therefrom to be secured to the sill 3, as shown in Figure 1, and on the underside of the sill at opposite sides of said arm there are cups or retaining collars 12 which receive the upper ends of coiled compression springs 13, the lower ends of said springs being seated in cups 14 which are arranged under and in vertical alinement with the upper cups 12, as will be understood upon reference to Figure 2. The cups 14 are mounted on a Y-shaped brace or connecting arm 15, the branches of which extend divergently inwardly and are pivoted, as at 16, in brackets or lugs 17 secured upon the beam 5 at the outer side of the dipped portion 6 thereof. The outer end of the Y-arm is bolted rigidly to the inner side of a plate 18 upon the outer side of which are arms 19 extending toward the wheel and pivoted in brackets 20 carried by and projecting from a backing plate 20a. The body of the Y-shaped arm is disposed under the wheel-turning shaft 7 with the cups 14 and the springs seated therein located equi-distant from the opposite sides of said shaft so that the wheel is balanced and may move upwardly to ride easily over obstructions. The backing plate extends upwardly to form a tapered hanger 21 located between the brackets 20, and at the top of the hanger is connected the outer end of a stirrup 25 which extends upwardly and inwardly and is pivotally secured by a single bolt 25a to the bridge of a U-shaped link 22, the link having its arms extending inwardly of the vehicle frame and pivoted, as at 23, to a bracket 24 on the upper side of the sill 3. As the stirrup is pivoted to the hanger and the link pivoted to the bracket 24 relative movement of the parts will be permitted and undesirable binding prevented. As will be seen from Fig. 2, the hanger is triangular form with upwardly converging reenforcing ribs 26 upon its inner side.

From the foregoing description, taken in connection with the accompanying drawings, it will be seen that I have provided a very compact mounting for a vehicle wheel which will be flexible but strong and durable. The springs hold the wheel constantly to the ground but yield readily when the wheel strikes an obstruction so that the wheel may ride over the obstruction without disturbing the level of the vehicle body. The wheel turning shaft being made in sections, as shown and described, will accommodate the vertical movement of the wheel without causing a vertical movement or oscillation of the differential and the brace and connecting arms which are pivoted to the supporting frame and to the backing plate will hold the wheel in its proper relation to the chassis so that there is no supporting strain on the shaft. The said connections may be an integral unit although they have been shown as separate parts bolted together. The arrangement shown and described permits the differential and propeller shaft housings to be secured rigidly to the vehicle frame so that no space need be left between the propeller shaft and the bottom of the body to accommodate the vertical movement of the shaft.

Having thus described the invention, what is claimed as new is:

In combination with the frame of a vehicle and a ground wheel for supporting the vehicle, a beam connected with the vehicle frame and extending longitudinally thereof, bearing brackets carried by said beam and extending from the outer side of the beam in spaced relation to each other longitudinally thereof, a backing plate for the ground wheel having its upper portion diverging inwardly from the wheel to form a hanger tapered upwardly and formed with a bearing at its upper end, ears projecting from the lower portion of the backing plate and spaced from each other transversely thereof, a Y-shaped frame having a vertically disposed plate at its outer end and arms diverging from the inner face of the plate and at their free ends pivoted to the bearing brackets carried by said beam, the arms being provided with spring seats, springs seated in said seats and bearing against the vehicle frame, a plate secured against the outer side face of the plate of the Y-frame and carrying transversely spaced outwardly extending arms pivoted at their outer ends to the ears of said backing plate, a stirrup pivoted to the bearing at the upper end of said hanger and extending upwardly therefrom, a bearing bracket carried by the vehicle frame over said springs, and a U-shaped link having its bridge secured at the upper end of said stirrup against the inner side face thereof and having arms extending inwardly toward the vehicle frame and pivoted to the bearing bracket carried thereby.

JAMES F. WHISENAND.